United States Patent
Tulino et al.

(10) Patent No.: US 9,686,358 B2
(45) Date of Patent: Jun. 20, 2017

(54) DEVICES AND METHODS FOR NETWORK-CODED AND CACHING-AIDED CONTENT DISTRIBUTION

(71) Applicant: Alcatel Lucent USA, Inc., Murray Hill, NJ (US)

(72) Inventors: Antonia Tulino, Red Bank, NJ (US); Jaime Llorca, Red Bank, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 159 days.

(21) Appl. No.: 14/502,113

(22) Filed: Sep. 30, 2014

(65) Prior Publication Data

US 2015/0207881 A1    Jul. 23, 2015

Related U.S. Application Data

(60) Provisional application No. 61/930,072, filed on Jan. 22, 2014.

(51) Int. Cl.
*H04L 29/08* (2006.01)
*G06F 17/30* (2006.01)
*H04L 12/26* (2006.01)
*H04L 12/721* (2013.01)

(52) U.S. Cl.
CPC .... *H04L 67/1097* (2013.01); *G06F 17/30902* (2013.01); *H04L 43/045* (2013.01); *H04L 43/062* (2013.01); *H04L 45/14* (2013.01); *H04L 67/06* (2013.01); *H04L 67/2833* (2013.01); *H04L 67/2842* (2013.01);

(Continued)

(58) Field of Classification Search
CPC ... H04L 29/08; H04L 12/721; H04L 67/1097; H04L 43/045; H04L 67/2833; H04L 67/2842; H04L 67/32; H04L 67/06; H04L 43/062; H04L 67/327; H04L 67/36; H04L 67/2847; H04L 45/14; G06F 17/30902
USPC .......................................................... 709/213
See application file for complete search history.

(56) References Cited

U.S. PATENT DOCUMENTS

| | | | |
|---|---|---|---|
| 7,916,665 B2* | 3/2011 | Le Bars | H04L 45/04 370/252 |
| 8,705,407 B2* | 4/2014 | Thai | H04K 3/00 370/255 |

(Continued)

OTHER PUBLICATIONS

Network-Coded Caching-Aided Multicast for Efficient Content Delivery Jaime Llorca, NJ USA, IEEE ICC 2013.*

(Continued)

*Primary Examiner* — Tauqir Hussain
(74) *Attorney, Agent, or Firm* — Harness, Dickey & Pierce, P.L.C.

(57) ABSTRACT

A method for caching in a network includes determining popularities for a plurality of data files based on requests for the plurality of data files. The method includes sending random packets of the plurality of data files to at least one destination based on the popularities. The method may include ranking the plurality of data files from a most popular data file to a least popular data file using the determined popularities. The method may include selecting, for each data file, a number of random packets based on the ranking, wherein the sending sends the selected number of random packets for each data file.

10 Claims, 4 Drawing Sheets

(52) U.S. Cl.
CPC .......... *H04L 67/2847* (2013.01); *H04L 67/32* (2013.01); *H04L 67/327* (2013.01); *H04L 67/36* (2013.01)

(56) References Cited

U.S. PATENT DOCUMENTS

| | | | |
|---|---|---|---|
| 2005/0097213 A1* | 5/2005 | Barrett | H04N 7/17336 709/231 |
| 2008/0002725 A1* | 1/2008 | Alicherry | H04L 45/04 370/401 |

OTHER PUBLICATIONS

Coded Caching with Non-uniform Demands Urs Niesen and Mohammed Ali Maddah-Ali Aug. 2013.*

J. Mingyue et al. "On the average performance of caching and coded multicasting with random demands," *2014 11th International Symposium on Wireless Communications Systems, IEEE*. Aug. 2014. XP 32666570.

M. Ji, A.M. Tulino, J. Llorca, and G. Caire, "Order optimal coded caching-aided multicast under zipf demand distributions," Feb. 2014. XP55178891.

Urs Niesen and Mohammad Ali Maddah-Ali, "Coded caching with nonuniform demands," arXiv preprint arXiv:1308.0178, 2013. XP 55178844.

J Llorca, A.M. Tulino, K Guan, J Esteban, M Varvello, N Choi, and D Kilper, "Network-coded caching-aided multicast for efficient content delivery," ICC, 2013 Proceedings IEEE. IEEE, 2013. XP 32522408.

M. Asad, R. Chaudhry, and A. Sprintson. "Efficient algorithms for index coding." *Computer Communications Workshops*, 2008. Apr. 2008. XP 31273967.

Z. Gao et al. "Network coding based schemes for imperfect wireless packet retransmission problems: A divide and conquer approach." *Wireless Personal Communications, Kluwer Academic Publishers, DO*. vol. 62(4). Aug. 2010. XP 35004245.

M. Ji, A.M. Tulino, J. Llorca, and G. Caire, "Order optimal coded delivery and caching: Multiple groupcast index coding," arXiv:1402.4572, 2014. Feb. 2014. XP 80006426.

International Search Report (PCT/ISA/210) mailed Apr. 8, 2015 for corresponding International Application No. PCT/US2015/011504.
Written Opinion of the International Searching Authority (PCT/ISA/237) mailed Apr. 8, 2015 for corresponding International Application No. PCT/US2015/011504.

International Search Report (PCT/ISA/210) mailed Apr. 9, 2015 for corresponding International Application No. PCT/US2015/011506.
Written Opinion of the International Searching Authority (PCT/ISA/237) mailed Apr. 9, 2015 for corresponding International Application No. PCT/US2015/011506.

Cisco, "The Zettabyte Era—Trends and Analysis," 2014.

M. Ji, G. Caire, and A. F. Molisch, "The throughput-outage tradeoff of wireless one-hop caching networks," arXiv preprint arXiv:1312.2637, 2013.

M. Ji, G. Caire, and A.F. Molisch, "Fundamental limits of distributed caching in d2d wireless networks," arXiv preprint arXiv:1304.5856, 2013.

M.A. Maddah-Ali and U. Niesen, "Fundamental limits of caching," arXiv preprint arXiv:1209.5807, 2012.

Mohammad Ali Maddah-Ali and Urs Niesen, "Decentralized caching attains order-optimal memory-rate tradeoff," arXiv preprint arXiv:1301.5848, 2013.

P. Gupta and P.R. Kumar, "The capacity of wireless networks," *Information Theory, IEEE Transactions*. 1999.

Y. Birk and T. Kol, "Informed-source coding-on-demand (iscod) over broadcast channels," 1998, IEEE.

S. A. Jafar, "Topological interference management through index coding," arXiv preprint arXiv:1301.3106, 2013.

A. Blasiak, R. Kleinberg, and E. Lubetzky, "Index coding via linear programming," arXiv preprint arXiv:1004.1379, 2010.

M. Ji, G. Caire, and A. F. Molisch, "Wireless device-to-device caching networks: Basic principles and system performance," arXiv preprint arXiv:1305.5216, 2013.

S. Gitzenis, GS Paschos, and L. Tassiulas, "Asymptotic laws for joint content replication and delivery in wireless networks," Arxiv preprint arXiv:1201 .3095, 2012.

N. Golrezaei, A.F. Molisch, A.G. Dimakis, and G. Caire, "Femtocaching and device-to-device collaboration: A new architecture for wireless video distribution," arXiv:1204.1595v1, 2012.

K. Shanmugam, A. G. Dimkakis, and M. Langberg, "Local graph coloring and index coding," arXiv preprint arXiv:1301.5359, 2013.

I. Haviv and M. Langberg, "On linear index coding for random graphs," arXiv:1107.0390v1.2011.

International Preliminary Report on Patentability dated Aug. 4, 2016 from corresponding International Application PCT/US2015/011504.

International Preliminary Report on Patentability dated Aug. 4, 2016 in corresponding International Application PCT/US2015/011506.

* cited by examiner

DEVICES AND METHODS FOR NETWORK-CODED AND CACHING-AIDED CONTENT DISTRIBUTION

CROSS-REFERENCE TO RELATED APPLICATIONS

This application claims priority under 35 U.S.C. §119(e) to provisional U.S. application No. 61/930,072 filed on Jan. 22, 2014, the entire contents of which are incorporated herein by reference.

BACKGROUND

Currently, content distribution networks (CDNs) face capacity and efficiency issues associated with the increase in popularity of on-demand audio/video streaming. One way to address these issues is through network caching and network coding. For example, conventional content distribution network (CDN) solutions employ centralized algorithms for the placement of content copies among caching locations within the network. Conventional solutions also include cache replacement policies such as LRU (least recently used) or LFU (least frequently used) to locally manage distributed caches in order to improve cache hit ratios. Other conventional solutions use random linear network coding to transfer packets in groups, which may improve throughput in capacity-limited networks.

However, conventional network caching and network coding solutions do not consider the relative efficiency of caching and transmission resources. This leads to suboptimal cost per delivered object or file. Moreover, conventional content delivery solutions do not exploit the possible combined benefits of network caching and network coding.

SUMMARY

At least one example embodiment is directed to methods and/or devices for caching packets of data files and/or delivering requested packets of data files.

According to at least one example embodiment, a method for caching in a network includes determining popularities for a plurality of data files based on requests for the plurality of data files. The method includes sending random packets of the plurality of data files to at least one destination based on the determining.

According to at least one example embodiment, the at least one destination includes a plurality of destination devices, and the determining determines the popularities on a per destination basis, and the sending sends the random packets on a per destination basis.

According to at least one example embodiment, the at least one destination is a plurality of destination devices, and the sending sends such that each destination device receives a given number of random packets for one of the data files based on the determined popularities and input parameters.

According to at least one example embodiment, the method includes ranking the plurality of data files from a most popular data file to a least popular data file using the determined popularities. The method includes selecting, for each data file, a number of random packets based on the ranking. The sending sends the selected number of random packets for each data file.

According to at least one example embodiment, the selecting selects a different number of random packets for each destination and for each of the data files according at least one of a respective rank of each data file and input parameters.

According to at least one example embodiment, the selecting includes dividing the ranked data files into at least a first subset and a second subset based on at least one threshold value, the first subset containing higher ranked data files than the second subset. The sending sends the selected number of random packets for only the data files in the first subset.

According to at least one example embodiment, the method includes receiving a request for one of the plurality of data files from the at least one destination. The method includes determining which packets of the requested data file are not stored at the at least one destination in response to the received request. The method includes sending the determined packets to the at least one destination.

According to at least one example embodiment, the method includes combining at least some of the determined packets to generate a composite packet, wherein the sending sends the composite packet to the at least one destination.

According to at least one example embodiment, a method includes receiving random first packets of a first data file, the first data file having an associated first popularity in relation to a second data file having an associated second popularity, the first and second popularities being based on requests for the first data file and the second data file. The method includes storing the first packets in a memory.

According to at least one example embodiment, the method includes receiving random second packets of the second data file, wherein the storing stores the second packets in the memory.

According to at least one example embodiment, the storing stores more packets for a more popular one of the first and second data files.

It should be understood that the above methods may be performed by a network element and/or a destination device.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of example embodiments.

DETAILED DESCRIPTION OF EXAMPLE EMBODIMENTS

Figure 1:
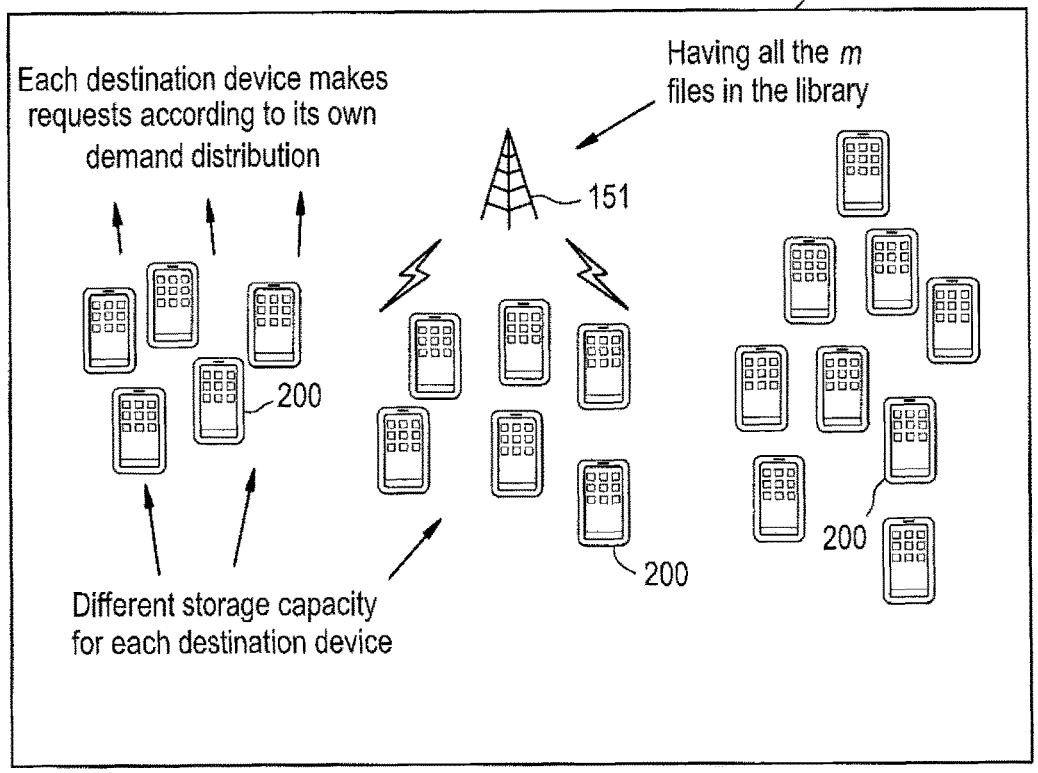
FIG. 1 shows a content distribution network according to at least one example embodiment.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements (e.g., base stations, base station controllers, NodeBs eNodeBs, etc.). Such existing hardware may include one or more Central Processors (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a special purpose processor or special purpose processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

FIG. 1 shows a content distribution network according to at least one example embodiment.

As shown in FIG. 1, a content distribution network (CDN) may include the network element 151 connected to a plurality of destination devices 200. The network element 151 may be a content source (e.g., a multicast source) for distributing data files (e.g., movie files). The destination devices 200 may be end user devices requesting data from the content source. For example, each destination device 200 may be part of or associated with a device that allows for the user to access the requested data. For example, each destination device 200 may be a set top box, a personal computer, a tablet, a mobile phone, or any other device associated used for streaming audio and video. Each of the destination devices 200 may include a memory for storing data received from the network element 151. The structure and operation of the network element 151 and destination devices 200 will be described in more detail below with reference to FIGS. 2 and 3.

Figure 2:
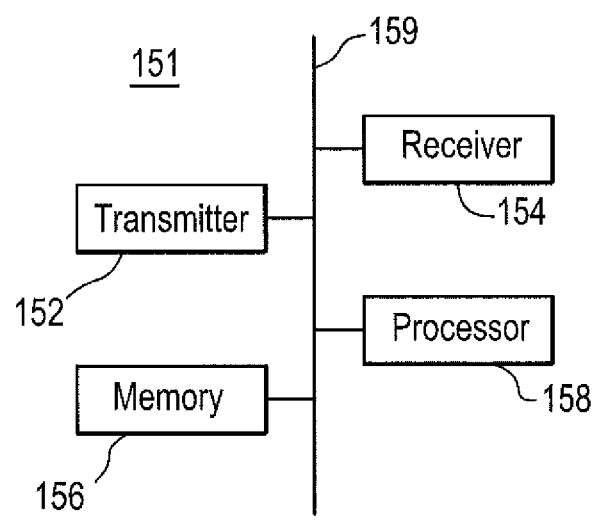
FIG. 2 is a diagram illustrating an example structure of network element according to an example embodiment.

FIG. 2 is a diagram illustrating an example structure of network element according to an example embodiment. According to at least one example embodiment, the network element 151 may be configured for use in a communications network (e.g., the content distribution network (CDN) of FIG. 1). Referring to FIG. 2, the network element 151 may include, for example, a data bus 159, a transmitter 152, a receiver 154, a memory 156, and a processor 158. Although a separate description is not included here for the sake of brevity, it should be understood that each destination device 200 may have the same or similar structure as the network element 151.

The transmitter 152, receiver 154, memory 156, and processor 158 may send data to and/or receive data from one another using the data bus 159. The transmitter 152 is a device that includes hardware and any necessary software for transmitting wireless signals including, for example, data signals, control signals, and signal strength/quality information via one or more wireless connections to other network elements in a communications network.

The receiver 154 is a device that includes hardware and any necessary software for receiving wireless signals including, for example, data signals, control signals, and signal strength/quality information via one or more wireless connections to other network elements in a communications network.

The memory 156 may be any device capable of storing data including magnetic storage, flash storage, etc.

The processor 158 may be any device capable of processing data including, for example, a special purpose processor configured to carry out specific operations based on input data, or capable of executing instructions included in computer readable code. For example, it should be understood that the modifications and methods described below may be stored on the memory 156 and implemented by the processor 158 within network element 151.

Further, it should be understood that the below modifications and methods may be carried out by one or more of the above described elements of the network element 151. For example, the receiver 154 may carry out steps of "receiving," "acquiring," and the like; transmitter 152 may carry out steps of "transmitting," "outputting," "sending" and the like; processor 158 may carry out steps of "determining," "generating", "correlating," "calculating," and the like; and memory 156 may carry out steps of "storing," "saving," and the like.

Figure 3A:
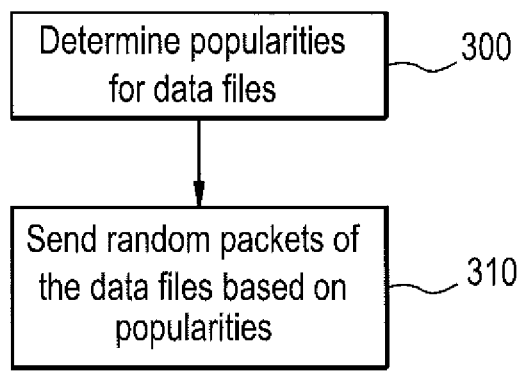
FIGS. 3A-3C are flow charts illustrating example operations of the network element in FIG. 2.
Figure 3B:
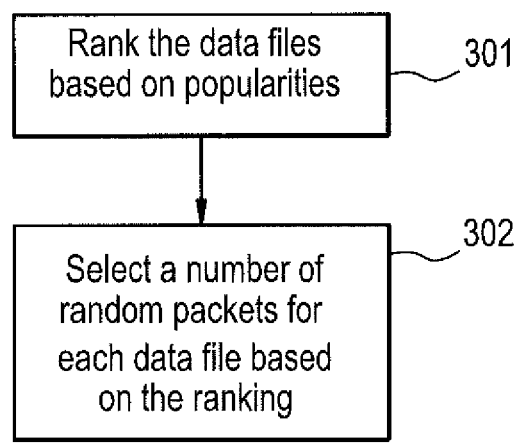
Figure 3C:
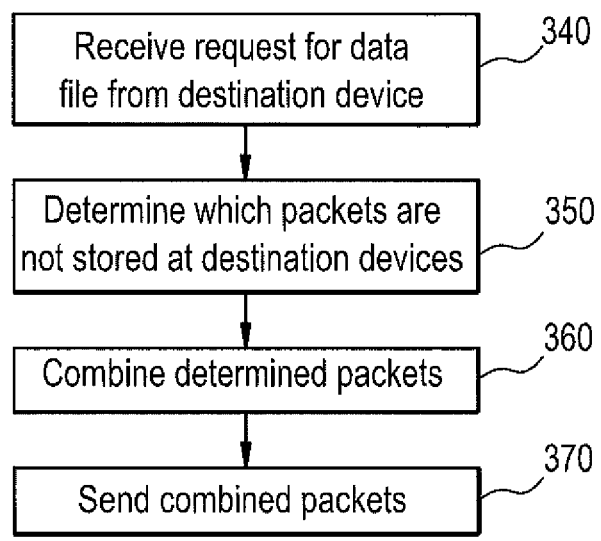

FIGS. 3A-3C are flow charts illustrating example operations of the network element in FIG. 2. For example, FIGS. 3A-3B show example operations for carrying out a method of caching in a communications network. FIG. 3C shows example operations for delivering data files after the caching method has been performed.

It should be understood that FIGS. 3A-3B are for carrying out a caching distribution method related to Algorithm 1 below, where each data file T is divided into 'B' equal-size packets, represented as symbols of a finite field and belongs to library 'F':

Algorithm 1: Caching algorithm 1 for f ∈ F →
2     Each user u caches a subset of
      $p_{u,f} M_u B$ distinct packets of file f
      uniformly at random;
3 endfor Algorithm 1: Caching algorithm 4     M = $\{M_{u,f},$ with u = 1,...,n, and f = 1,...,m$\}$;
5 return( M );
end Caching algorithm In Algorithm 1, '$p_u = [p_{u,1}, \ldots p_{u,m}]$' is the caching distribution of the 'u' destination device 200, where $\Sigma_{f=1}^{m} p_{N,f} = 1, \forall u$ with u=1, ..., n, and $0 \leq p_{N,f} \leq 1/M_u$, $\forall f = 1, \ldots, m$, u=1, ..., n, 'm' is the number of files hosted by the network element 151, and '$M_u$' is the storage capacity of the cache at destination device 'u' (i.e., destination device 200) and $M_{u,f} = p_{u,f} M_u B$ denotes the packets of file f cached at user u. The network element 151 carries out Algorithm 1 such that destination device, 'u', 200 caches $M_{u,f} = p_{u,f} M_u B$ packets of file 'f'. Furthermore, the randomized nature of Algorithm 1 allows network element 151 to perform operations such that, if two destinations caches the same number of packets for a given file 'f', then each of the two destination device 200 caches different packets of the same file 'f'. Algorithm 1 may be implemented by network element 151 according to the operations described in FIGS. 3A-3B below.

Referring to FIG. 3A, in operation 300, the network element 151 may determine popularities for a plurality of data files. The data files may be, for example, video and/or audio files. The network element 151 may determine the popularities based on requests for the plurality of data files from at least one of destination devices 200 (e.g., user requests). The user requests may form a demand distribution for the data files. The network element 151 may determine the popularities according to a demand distribution of all the destination devices 200. In this case, the demand distribution may follow a Zipf distribution. Alternatively, the network element 151 may determine the popularities on a per destination device basis where each destination device 200 has an associated demand distribution.

The network element 151 may determine the popularities based on a number of requests for the data files from the destination devices 200. For example, the network element 151 determines a data file that is requested 100 times by the destination devices 200 as having a higher popularity than a data file that is requested 50 times. Thus, the popularities may be based on which data files are most often requested and viewed by users of the destination devices 200.

The network element 151 may divide each data file into a plurality of packets. For example, the network element 151 may divide each data file in to a same number of packets (e.g., three packets). Accordingly, in operation 310, the network element 151 may send random packets of the plurality of data files to at least one destination device based on the popularities determined in operation 300. For example, the network element 151 may send random packets of each data file to destination devices 200 such that the random packets are stored (or cached) at each destination device 200.

The network element 151 may send the random packets such that each destination device 200 receives a given number of random packets for at least one of the data files based on the determined popularities and input parameters (e.g., number of destination devices, popularity distribution, cache size of each destination device, size of the data file library at network element 151, etc.). For example, the network element 151 may send a same number of packets to each destination device 200 if the destination devices 200 have a same size cache and a same demand distribution (e.g., the destination devices are homogeneous). In one example, assume that there are two destination devices 1 and 2 and two files A and B, divided into ten packets. If (i) destination devices 1 and 2 request file A and file B with the same frequency and file A is requested by both destinations with more frequency than file B, and (ii) the two destination devices 1 and 2 have the same cache size, for example six units in terms of packets, then the network element 151 will perform the caching method such that both destination devices 1 and 2 cache four packets of file A and two packets of file B.

If the network element 151 determined the popularities on a per destination device basis in operation 300, then the network element 151 may send the random packets on a per destination device basis in operation 310. For example, the network element 151 may send a different number of packets to each destination if the destinations devices 200 have different size caches or different demand distributions. In this case, referring to the example above, destination device 1 could receive seven packets of file A and three packets of file B while destination device 2 could receive two packets of file A and five packets of file B. This could be due the fact that destination device 1 requests file A much more than file B and has total cache size of ten units in terms of packets, while destination 2 device requests file A much less than file B and has a total cache size of seven units in terms of packets.

FIG. 3B illustrates example operations of the network element 151 that may be carried out between operations 300 and 310, if desired. For example, following operation 300 in FIG. 3A, the network element 151 may rank the data files based on the determined popularities. For example, in operation 301, the network element 151 may rank the data files from a most popular data file to a least popular data file using the popularities determined in operation 300.

In operation 302, the network element 151 may select, for each data file, a number of random packets based on the ranking. For example, the network element 151 selects a different number of random packets for each of the data files according at least one of a respective rank of each data file and the input parameters of the network (e.g., number of destination devices, popularity distribution, cache size of each destination device, size of the data file library at network element 151, etc.). After operation 302, the network element 151 may proceed back to operation 310 in FIG. 3A to send the selected number of random packets for each data file.

It should be appreciated that operation 302 may include the network element 151 dividing the ranked data files into at least a first subset and a second subset based on at least one threshold value. The at least one threshold value may be based on empirical evidence and/or user defined. The first subset may contain higher ranked data files than the second subset. Thus, in operation 310, the network element 151 may send the selected number of random packets for only the data files in the first subset. This may allow for a more efficient caching of the packets at the destination devices 200.

It should be understood that the operations described with reference to FIGS. 3A and 3B allow for improved performance of the network because of the scheme's ability to cache more packets of the more popular files and to increase (or alternatively, maximize) the amount of distinct packets of each file collectively cached by the destination devices 200.

FIG. 3C shows example operations for sending packets after the caching operations in FIGS. 3A and/or 3B have been performed. In operation 340, the network element 151 may receive a request for one of the plurality of data files from at least one of the destination devices 200. In operation 350, the network element 151 may determine which packets of the requested data file are not stored (or cached) at the at least one destination device 200 in response to the received request. In operation 360, the network element 151 may combine at least some of the determined packets to generate a composite packet. For example, the network element may perform exclusive-OR (XOR) operations (or other linear combination over a finite field) on two or more packets and to create composite packets. The manner in which the network element 151 may determine which of the determined packets to combine into a composite packet may be selected based on a distribution of the packets across the destination devices 200 and is discussed in more detail below with reference to an example. In operation 370, the network element 151 sends the composite packets to the destination devices 200. The network element 151 may send the composite packets to the destination devices 200 in a multicast transmission.

Figure 4:
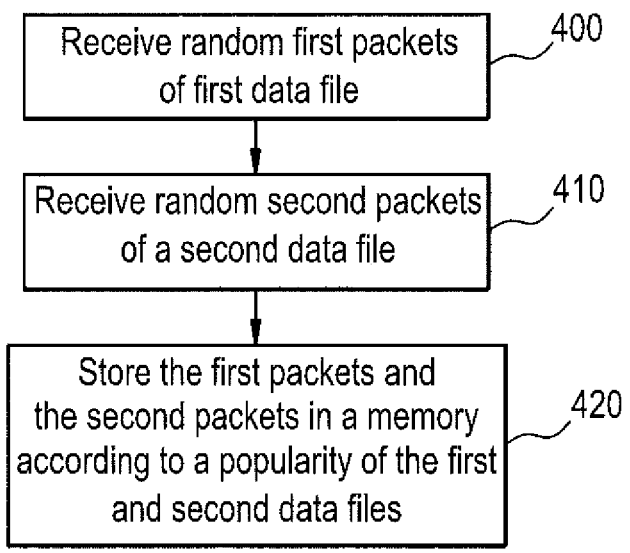
FIG. 4 shows example operations of a destination device according to at least one example embodiment.

FIG. 4 shows example operations of a destination device according to at least one example embodiment. The destination device may be one of the destination devices 200 from FIG. 1.

Although a separate description is not included here for the sake of brevity, it should be understood that each destination device 200 may have the same or similar structure as the network element 151.

In operation 400, a destination device 200 receives random first packets of a first data file from, for example, the network element 151. The first data file may have an associated first popularity in relation to a second data file having an associated second popularity. The first and second popularities may be based on requests for the first data file and the second data file from the destination 200 and/or a plurality of destination devices (e.g., user requests). In operation 410, the destination device 200 may store the first packets in a memory. In operation 420, the destination device 200 may receive random second packets of the second data file. In this case, the storing operation 420 includes storing the second packets in the memory. In operation 420, the destination device 200 may store more packets for a more popular one of the first and second data files. It should be understood that FIG. 4 represents operations carried out by a destination device 200 as a result of the network element 151 carrying out the operations in FIGS. 3A and 3B. Thus, FIG. 4 represents the destination device side operations performed as a result of implementing Algorithm 1.

The operations of FIGS. 3A-3C and 4 are further described below with reference to an example in which a content distribution network (e.g., the network of FIG. 1) with n user devices (i.e., destination devices 200 in FIG. 1) U={1, ..., n} are connected through a single bottleneck link to a server (i.e., the network element 151 in FIG. 1). The server has access to a content library F={1, ..., m} containing m files of same size of B packets. Each user device "u" has a cache of size $M_u$ files (i.e., $M_u$B packets). The bottleneck link may be a shared deterministic channel that transmits one file per unit time, such that all the users can decode the same multicast codeword. At each time unit (or time slot), each user device requests an arbitrary set of $L_u$ files in F (i.e $L_u$ is the number of files requested by user device "u"). Such requests form a matrix F with columns $f_u = (f_{u,1}, f_{u,2}, \ldots, f_{u,L_u})^T$ corresponding to the requests of each user device $u \in U$. Let $$L = \max_u L_u.$$

We order $L_u$ with $u \in U$ as a decreasing sequence denoted as $L_{[1]} \geq L_{[2]} \geq \ldots \geq L_{[n]}$ where $L_{[i]}$ is the i-th largest $L_u$ and $[i] = u$. Hence, we have, for example, $$L_{[n]} = \min_u L_u.$$

Let $$n_j = \sum_{[i]} 1\{L_{[i]} - j \geq 0\}$$

where $1\{\bullet\}$ is the indicator function and let $U_{n_j} = \{[i] \in U : 1\{L_{[i]} - j > 0\}\}$.

This example includes two distinct phases: a caching phase and a delivery phase. The caching phase (or cache formation) is performed as a function of the files in the library, but does not depend on the request matrix F For example, the caching phase may be based on Algorithm 1 and performed by the network element 151 according to the operations in FIGS. 3A and 3B. Then, during the delivery phase, at each time slot, given the current request matrix F, the server (i.e., network element 151) forms a multicast codeword and transmits the codeword over the bottleneck link such that all user devices can decode their requested files using the packets cached at the user devices as keys. The delivery phase may occur in accordance with the operations described in FIG. 3C.

The caching phase may be described by the following:

$$\text{find: } [p_1^* \ldots p_n^*] = \underset{p_u : p_{u,f} \leq 1/M_u^1 \sum_f p_{u,f} = 1}{\arg\min} \overline{R}^{ub}([p_1 \ldots p_n], [q_1 \ldots q_n]),$$

where $$\overline{R}^{ub}([p_1 \ldots p_n], [q_1 \ldots q_n]) \triangleq \min\{\psi([p_1 \ldots p_n], [q_1 \ldots q_n]), \overline{m} - \overline{M}\},$$

$$\overline{m} = \sum_{f=1}^{m} \left(1 - \prod_{u=1}^{n} (1 - q_{u,f})^{L_u}\right),$$

$$\overline{M} = \sum_{f=1}^{m} \min_{u \in U} \{p_{u,f}\} \left(1 - \prod_{u=1}^{n} (1 - q_{u,f})^{L_u}\right),$$

$$\psi(P, Q) = \sum_{j=1}^{L} \sum_{\ell=1}^{n} \sum_{U^\ell \in U_{n_j}} \sum_{f=1}^{m} \sum_{u \in U^\ell} \rho_{u,f,U^\ell} (1 - p_{u,f} M_u)^{n_j - \ell + 1} (p_{u,f} M_n)^{\ell - 1}$$

with $$\rho_{i,f,U^\ell} \triangleq P\left(f = \arg \max_{f_u \in f(U^\ell)} (p_{u,f} M_u)^{\ell-1} (1 - p_{u,f} M_u)^{n_j - \ell + 1}\right).$$

denoting the probability that f is the file whose $p_{u,f}$ maximizes the term $(p_{u,f} M_u)^{\ell-1} (1 - p_{u,f} M_u)^{n_j - \ell + 1}$ among $f(U^\ell)$ (the set of files requested by the users contained in the set $U^\ell$).

Observe that under the assumption that L=1 and homogeneous popularity and cache size, $q_{u,f} = q_f$, $M_u = M$, $\forall u \in U$, then $p_{u,f} = p_f$, $\forall u \in U$, and the previous expressions simplify to:

$$\overline{m} = \sum_{f=\lfloor M \rfloor + 1}^{m} (1 - (1 - q_f)^n),$$

and $$\psi(P, Q) = \sum_{\ell=1}^{n} \binom{n}{\ell} \sum_{f=1}^{m} \rho_{f,\ell} (1 - p_f M)^{n - \ell + 1} (p_f M)^{\ell - 1},$$

where $\rho_{f,l} \triangleq P(f = \arg\max_{j \in F^l} (p_j M)^{l-1} (1 - p_j M)^{n-l+1})$ denotes the probability that file f is the file whose $p_f$ maximizes the term $((p_j M)^{l-1} (1 - p_j M)^{n-l+1})$ among $F^l$ (the set of files requested by an arbitrary subset of users of size l).

Given that $\overline{R}^{ub}(\lfloor p_1^* \ldots p_n^* \rfloor, [q_1 \ldots q_n])$ may not have an analytically tractable expression in general, we now present a simpler scheme that approximates the optimization in two paragraphs above by searching the optimal caching distribution $\lfloor p_1^* \ldots p_n^* \rfloor$ over all possible caching ditribution of the following form:

$$\tilde{p}_{u,f} = \frac{1}{\tilde{m}_u}, f \leq \tilde{m}_u$$

$$\tilde{p}_{u,f} = 0, f \geq \tilde{m}_u + 1$$

where $\tilde{m}_u \geq M_u$ is a function of m, n, $[M_1 \ldots M_n]$, $[q_1 \ldots q_n]$. The form of $\lfloor p_1^* \ldots p_n^* \rfloor$ is intuitive in the sense that each user device just randomly caches packets (may not be the entire file) from the $\tilde{m}$ most popular files by using Algorithm 1.

Using the expressions above in the case where all the files have equal popularity and cache size, i.e. $q_u = q$, and $M_u = M$ $\forall u = 1, \ldots, m$, then the optimal caching distribution is the uniform caching distribution i.e, $p_{u,f} = M/m$, $\forall f = 1, u = 1 \ldots n$. For example, if we have m=n=3 and M=1, and B=3, denoting user devices as 1, 2, 3 and files as A, B, C, and we have divided the files as follows: file $A = \{A_1, A_2, A_3\}$, file $B = \{B_1, B_2, B_3\}$ and file $C = \{C_1, C_2, C_3\}$. Then, the user device caches Z are given by: $Z_1 = \{A_1, B_1, C_1\}$, $Z_2 = \{A_2, B_2, C_2\}$, $Z_3 = \{A_3, B_3, C_3\}$.

Since each user device cache stores a part of each file, the delivery phase consists of providing to each user device the missing part of the requested files, i.e., the packets missing from that user device's cache. For instance, with reference to FIG. 3C, given the caching placement of the example above, if user device 1 requests file A, then user device 1 should request packets $A_2$ and $A_3$ in operation 340.

The delivery phase may be carried out by network element 151 after construction of a conflict graph, where each packet requested by each user device is represented by a single vertex on the conflict graph. The vertices of the conflict graph are then colored according to, for example, a minimum vertex coloring (e.g., a chromatic number based coloring). With reference to operations 360 and 370, the network element 151 may combine packets represented by vertices with a same color using an exclusive-OR (XOR) operation (or other linear combination operation over a finite field) to generate composite packets and then send the composite packets to destination devices 200 via a multicast transmission. Then, the destination device 200 may decode the encoded packets by performing a set of XOR operations (or a set of other linear combination operations).

It should be understood that the operations described with reference to FIGS. 3A-3C allow for improved performance of the network because of the scheme's ability to cache more packets of the more popular files, to increase (or alternatively, maximize) the amount of distinct packets of each file collectively cached by the destination devices 200, and to allow coded multicast transmissions within a full set of requested packets of the data files.

Variations of the example embodiments are not to be regarded as a departure from the spirit and scope of the example embodiments. All such variations as would be apparent to one skilled in the art are intended to be included within the scope of this disclosure.

What is claimed is:

1. A method for caching in a content distributed network (CDN), comprising:
    determining, by at least one processor of at least one network node of the CDN, popularities for a plurality of data files based on requests for the plurality of data files, the requests being made by one or more of a plurality of destination devices;
    sending, by the at least one processor, random packets of the plurality of data files to at least one destination based on the determining,
    wherein the at least one destination includes the plurality of destination devices, the determining determines the popularities on a per destination basis, and the sending sends the random packets on a per destination basis;
    ranking the plurality of data files from a most popular data file to a least popular data file using the determined popularities; and
    selecting, for each data file, a number of random packets based on the ranking, wherein the sending sends the selected number of random packets for each data file,
    the selecting includes dividing the ranked data files into at least a first subset and a second subset based on at least one threshold value, the first subset containing higher ranked data files than the second subset, and
    the sending sends the selected number of random packets for only the data files in the first subset.

2. The method of claim 1, wherein the sending sends such that each destination device receives a given number of random packets for one of the data files based on the determined popularities and input parameters.

3. The method of claim 1, wherein the selecting selects a different number of random packets for each destination and for each of the data files according at least one of a respective rank of each data file and input parameters.

4. The method of claim 1, further comprising:
    receiving a request for one of the plurality of data files from the at least one destination;
    determining which packets of the requested data file are not stored at the at least one destination in response to the received request; and
    sending the determined packets to the at least one destination.

5. The method of claim 4, further comprising:
    combining at least some of the determined packets to generate a composite packet, wherein the sending sends the composite packet to the at least one destination.

6. A network element in a content distributed network (CDN), comprising:
    a processor configured to,
        determine popularities for a plurality of data files based on requests for the plurality of data files, the requests being made by one or more of a plurality of destination devices, and
        send random packets of the plurality of data files to at least one destination based on the determining
        wherein the at least one destination includes a plurality of destination devices, and the processor is configured to determine the popularities on a per destination basis, and send the random packets on a per destination basis,
        rank the plurality of data files from a most popular data file to a least popular data file using the determined popularities,
        select, for each data file, a number of random packets based on the ranking, wherein the sending sends the selected number of random packets for each data file
        divide the ranked data files into at least a first subset and a second subset based on at least one threshold value, the first subset containing higher ranked data files than the second subset, and
        send the selected number of random packets for only the data files in the first subset.

7. The network element of claim 6, wherein the at least one destination is a plurality of destination devices, and the processor is configured to send the random packets such that each destination device receives a given number of random packets for one of the data files based on the determined popularities and input parameters.

8. The network element of claim 6, wherein the processor is configured to select a different number of random packets for each destination and for each of the data files according at least one of a respective rank of each data file and input parameters of the network.

9. The network element of claim 6, wherein the processor is configured to,
    receive a request for one of the plurality of data files from the at least one destination,
    determine which packets of the requested data file are not stored at the at least one destination in response to the received request, and
    send the determined packets to the at least one destination.

10. The network element of claim 9, wherein the processor is configured to combine at least some of the determined packets to generate a composite packet, and send the composite packet to the at least one destination.

* * * * *